United States Patent [19]

Huss et al.

[11] Patent Number: 5,706,011
[45] Date of Patent: Jan. 6, 1998

[54] METHOD FOR DETERMINING TERRAIN FOLLOWING AND TERRAIN AVOIDANCE TRAJECTORIES

[75] Inventors: Ronald E. Huss, Los Angeles; Mark A. Pumar, Thousand Oaks, both of Calif.

[73] Assignee: Hughes Electronics, Los Angeles, Calif.

[21] Appl. No.: 482,337

[22] Filed: Jun. 7, 1995

[51] Int. Cl.[6] .................................................. G01S 13/94
[52] U.S. Cl. ............................................................ 342/65
[58] Field of Search ..................... 342/65, 118; 244/3.15; 364/424.012, 444.2, 461

[56] References Cited

U.S. PATENT DOCUMENTS

| | | | |
|---|---|---|---|
| 4,760,396 | 7/1988 | Barney et al. | 342/65 |
| 4,812,990 | 3/1989 | Adams et al. | 364/424.012 |

*Primary Examiner*—Daniel T. Pihulic
*Attorney, Agent, or Firm*—Leonard A. Alkov; Wanda K. Denson-Low

[57] ABSTRACT

A method that enables an aircraft to determine an optimal terrain following, terrain avoidance, or threat avoidance trajectory over terrain, thereby reducing its exposure and increasing its survivability. A grid of discrete terrain points corresponding to the terrain above which the aircraft is to fly is formed. Each point has a cost that is function of predetermined criteria. A cost is assigned to each of the points that is representative of the cost to get to the point based upon the predetermined criteria. A terminal point is selected that is a point that must be flown through at the end of the trajectory over the terrain, or in order to clear an obstacle in the flight path of the aircraft. A series of paths is computed through the terrain points to a selected terminal point, taking into account the aircraft's maneuvering capability and current attitude. A total cost at the terminal point is computed for each path, and the total cost for a particular path is the sum of costs at the terminal point plus the respective costs of all terrain points along the path. The path that has the least total cost to arrive at the selected terminal point is selected. The aircraft is then guided along a trajectory defined by the selected path. The present method not only generates trajectories lower than those generated by current procedures, but also identifies regions where natural terrain masking provides cover without requiring extremely low flight, thus reducing the stress on both aircraft and pilot.

3 Claims, 6 Drawing Sheets

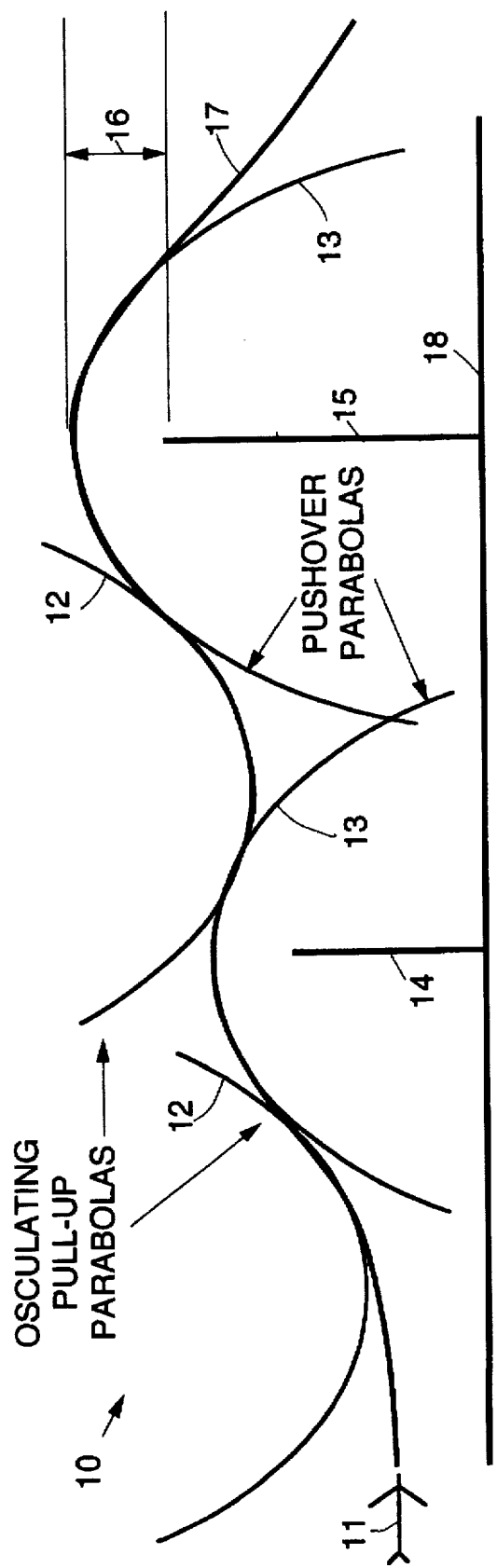

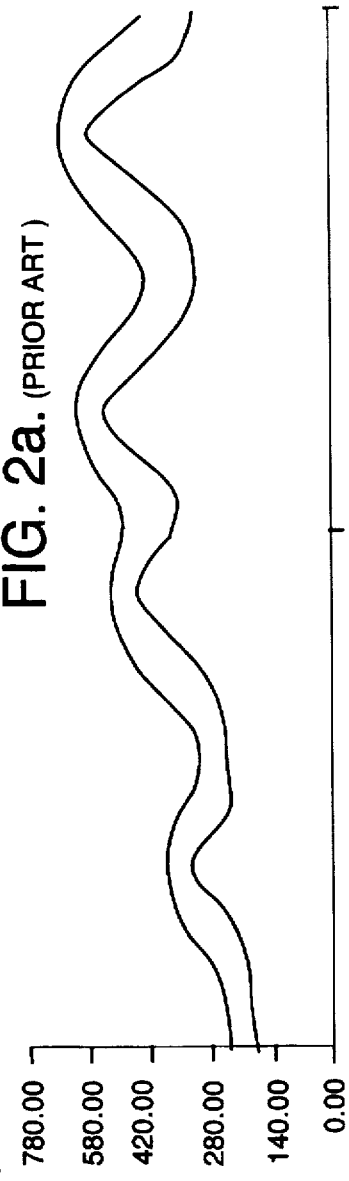
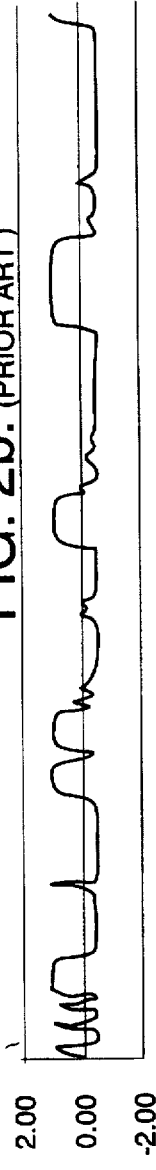
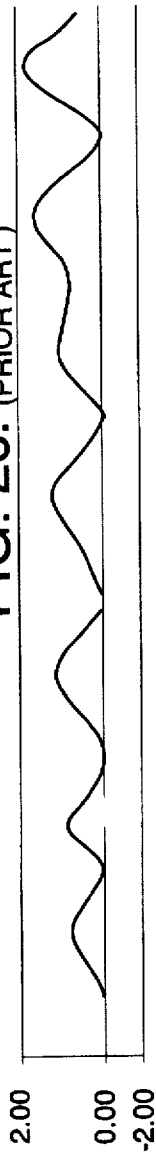
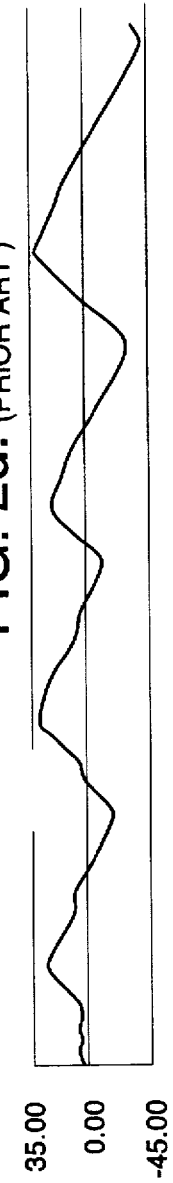
FIG. 2a. (PRIOR ART)
FIG. 2b. (PRIOR ART)
FIG. 2c. (PRIOR ART)
FIG. 2d. (PRIOR ART)

METHOD FOR DETERMINING TERRAIN FOLLOWING AND TERRAIN AVOIDANCE TRAJECTORIES

BACKGROUND

The present invention relates generally to terrain following radars used in aircraft flight control systems, and more particularly, to a method for determining terrain following and terrain avoidance trajectories for use in such terrain following radars.

Currently, there is considerable interest in the development of aircraft flight control systems that will respond readily to terrain and threat information to find safe paths through hostile environments. Such systems must respond rapidly to threat information, since delays can result in substantially greater probabilities of engagements. Such work has been done in finding paths through defenses when it is assumed that the aircraft will fly at a constant height above the surface of the earth.

This work is described in "Defense Suppression Fire Control Design Technical Report," Draft Final Report, Hughes Aircraft Company, September, 1984, "Route Finding Using Digital Terrain Data," by R. E. Huss and J. W. Weber, in Proc. 5th Digital Avionics Conf., Nov., 1983, pages 14.4.1–14.4.4, and "Terrain/Threat Display Algorithms Program, 'Purple Haze'," R & D Associates, Report No. AFWAL-TR-81-3134, 1981 (Secret). It is normally assumed that when these paths are flown, vertical and lateral motions will be decoupled and the flight will be safe. That is, the path will be laid out in two dimensions and standard terrain following techniques will be adequate to perform the vertical part of the flight with no substantial increase in the expected risk.

However, recent work has indicated that three dimensional flight optimization can substantially reduce the risk, and at the same time provide a less stressful ride for the pilot. Thus, the emphasis of the work must shift to solving for optimal flight paths in three dimensions.

If one begins with the initial approach of decoupling lateral and vertical motion, it is natural to assume that conventional flight path trajectory determination techniques such as ADLAT (Advanced Low Altitude Techniques) are adequate. The ADLAT method is described in detail in "Terrain Avoidance Technique Evaluation", Project ADLAT, by E. C. Schwartz, Final Report, CAL Report No. IH-1706E-7. However, it is readily apparent that such procedures have many severe shortcomings, and they may be inappropriate for some applications.

Currently, the best available procedure for generating terrain following trajectories is a parabolic curve matching scheme. This procedure is generally termed the ADLAT control law or procedure. The ADLAT procedure requires many acceleration changes during the course of the flight. These large and frequent changes in acceleration are uncomfortable for the pilot and produce only small changes in the state of the aircraft. In addition this procedure is not easily extendable to three dimensional terrain following. The ADLAT procedure is purely a two dimensional trajectory generator that does not take advantage of natural terrain masking thereby increasing pilot stress, probability of clobber, and probability of detection.

The ADLAT control procedure used for terrain following is a parabolic curve matching scheme. This procedure is generally termed the ADLAT procedure described in the Schwartz report cited above. The ADLAT terrain following procedure accepts an equally spaced profile of the terrain in from of the aircraft along with the aircraft's current altitude and velocity and generates vertical acceleration commands.

A "push-over" parabola characterized by the maximum allowed deceleration of the aircraft is fitted over each point in the terrain profile. The procedure then calculates the vertical acceleration needed to reach the next point in the profile. This defines the state (altitude and velocity) of the aircraft over the next point in the profile. This projected state and the maximum allowed vertical acceleration of the aircraft defines the "pull-up" parabola. The pull-up parabola represents the upward trajectory of the aircraft using the maximum vertical acceleration from the this state. The ADLAT procedure compares this pull-up parabola with each push-over parabola in the terrain profile and looks for intersections of the curves. If there are no intersections the calculated value is the next command. If an intersection does occur, the initial calculation is repeatedly revised until no parabola intersections occur. This minimum acceleration (within the limits) that allows no parabola intersections is taken to be the next vertical acceleration command.

The ADLAT procedure produces reasonably good terrain following profiles. That is, the aircraft is kept close to the ground without overshooting or undershooting points in the terrain profile. However, the ADLAT procedure suffers from several major defects that limit its utility in some advanced applications: it produces a "rough" ride, in that many short but abrupt acceleration commands are executed; it is difficult to adapt to flight constraints; it is difficult to adapt to flight path optimization for integral objective functions. The following paragraphs describe more fully these difficulties, and some of the ways in which they have been coped with.

The "rough" ride produced by ADLAT can most easily be illustrated by the example shown in FIG. 1. The figure shows a typical terrain following run made using the ADLAT procedure. FIG. 2 contains a curve labeled "g-commands". This function shows the acceleration commands generated by the ADLAT procedure over the flight path. As can be seen from the figure, many acceleration changes occur during the course of the flight. These large and frequent changes in acceleration are uncomfortable for the pilot. Furthermore, most of these commands produce only small changes in the state of the aircraft. From this observation one might be led to believe that many of these changes are unnecessary for proper terrain following but are rather artifacts of the ADLAT procedure. Analysis of the ADLAT procedure shows this to be the case. The details are too lengthy to discuss here, but it is apparent that the problem is inherent in the algorithm, and as such cannot be easily corrected within its frame work.

The ADLAT procedure is not easily adaptable to optimal route planning. Recent studies have shown that with the use of digital data bases and intelligence information on the location of antiaircraft threats, "optimal" routes for aircraft penetration can be computed. These optimal route finding procedures compute paths of least exposure to air defense threats. As a by-product, they also show how high the aircraft can fly along the route without exposure. This gives rise to a new dimension in terrain following. The aircraft need not always stay close to the ground as traditionally thought. Instead, all that is required is to stay low enough so as not to be visible to the surrounding threats. This means that there may be regions along the route where the aircraft can fly considerably above the terrain following command height and still avoid detection. The advantages of doing this are clear: pilot stress and probability of clobber are both reduced. Unfortunately the ADLAT procedure is not suited to take advantage of this type of information.

The ADLAT procedure is not easily extendable to three dimensional terrain following. In this mode, both horizontal and vertical acceleration commands must be generated. Decisions must be made to go over or around obstacles. The ADLAT procedure is purely a one dimensional (i.e., profile) method. Crude two dimensional terrain following has been proposed using the ADLAT procedure. Wide azimuth scans of the terrain are taken and collapsed to form a one dimensional profile. The profile collapsing process consists of taking the maximum terrain height among all of the azimuth profiles at each range. This very conservative policy unfortunately results in higher than necessary terrain clearance heights along the true ground track. In true three dimensional control, altitude is also a decision variable. Adapting the ADLAT procedure to incorporate altitude would be a major task, with uncertain results.

The ADLAT procedure complexity is greatly increased with the addition of constraints such as climb and dive limits, and hence is relatively inflexible. The ADLAT procedure was rewritten to include climb and dive constraints on the aircraft. The result was a doubling of the complexity and the execution time. The ADLAT procedure is myopic, in that it generates only short term commands. One acceleration command at a time is generated by the procedure. This results in a large duplication of computational effort each time a new command is generated. Long term policy generation would reduce this needless computation and enhance other capabilities such as in-flight route replanning.

The ADLAT procedure is based on parabolic flight segments, and assumes that the horizontal velocity remains constant. This is adequate for normal terrain following flight, where the flight path angle changes little. If the angle is large (e.g., 30 degrees), the procedure begins to lose some validity. A far more serious problem exists if the procedure is to be used where extreme velocity changes are normal operating procedures, such as in rotary wing flight. In this case, the ADLAT procedure may be totally unsuitable.

From the above, it is apparent that it would be an improvement in the art to have a procedure that provides for three dimensional terrain following and that achieves better performance than the conventional ADLAT procedure.

SUMMARY OF THE INVENTION

The present procedure enables an aircraft to determine an optimal terrain following, terrain avoidance, or threat avoidance trajectory through hostile territory, thereby reducing exposure and increasing its survivability. The procedure is based on a novel use of dynamic programming, which solves the problem of full three-dimensional constrained flight path optimization.

More particularly, the present method is a method for determining a terrain following and terrain avoidance trajectory for use in terrain following radars employed in guiding a moving aircraft above a predetermined terrain profile. The method comprises the following steps. A grid comprising a series of discrete terrain points corresponding to the terrain profile above which the aircraft is to fly is formed. Each terrain point has a cost associated therewith that is function of predetermined criteria including distance of each terrain point from the aircraft, a height of each terrain point above the terrain at each distance, and attitude of the aircraft at its current position and at each terrain point. A cost is assigned to each of the discrete terrain points that is representative of the cost to get to the point based upon the predetermined criteria. A terminal point is selected from the series of discrete terrain points, which terminal point comprises a terrain point that must be flown through at the end of the trajectory over the terrain, or in order to clear an obstacle in the flight path of the aircraft.

A series of paths is computed through the terrain points from a starting point at the current position of the aircraft to the selected terminal point, taking into account the aircraft's maneuvering capability and current attitude. A total cost at the terminal point is computed for each path of the series of paths, and wherein the total cost for a particular path comprises the sum of costs at the terminal point plus the respective costs of all terrain points along the particular path. The path that has the least total cost is selected and which comprises the minimum integrated total cost over the terrain profile to arrive at the selected terminal point. The aircraft is then guided along a trajectory defined by the selected path having the minimum integrated total cost.

The present procedure allows the computation of optimal three-dimensional flight trajectories through heavily defended areas, thereby increasing the survivability of penetrating aircraft. The present procedure not only generates trajectories lower than those generated by current procedures, but also identifies regions where natural terrain masking provides cover without requiring extremely low flight, thus reducing the stress on both aircraft and pilot.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates the conventional ADLAT procedure;

FIGS. 2a, 2b, 2c and 2d show a typical terrain following run made using the ADLAT procedure of FIG. 1;

DETAILED DESCRIPTION

Figure 3:
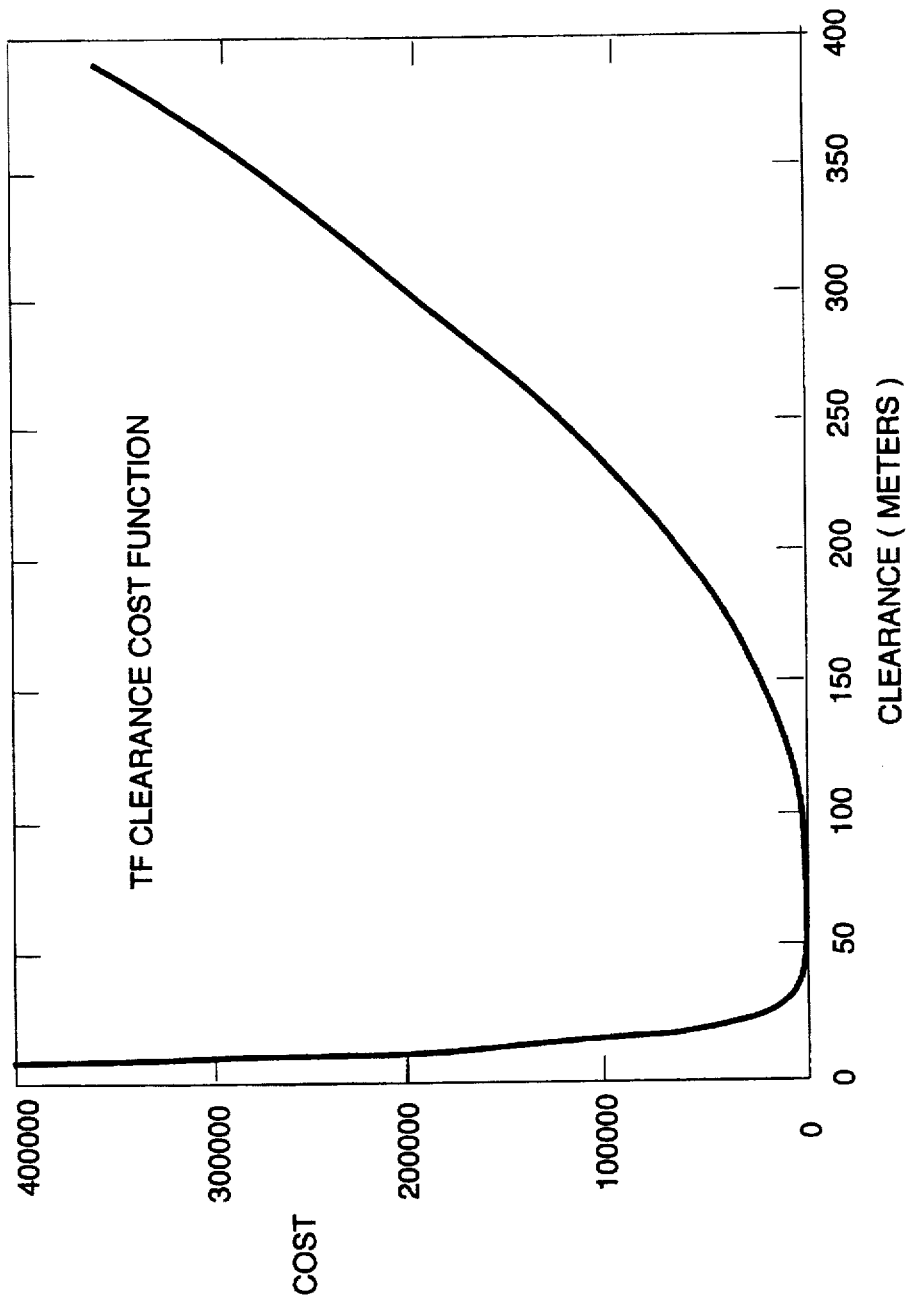
FIG. 3 shows a typical cost function employed in the terrain following run of FIG. 2.

The defects described above severely limit the utility of the ADLAT control procedure. In fact, if one desires to do anything other than one-dimensional terrain following (i.e., terrain following over a profile), a better control procedure is required than that provided by the ADLAT procedure. Such a procedure has been developed using dynamic programming and is at the heart of the present invention. Dynamic programming is generally described in a book entitled "Dynamic Programming," by R. E. Bellman, Princeton University Press, 1957. The present control procedure eliminates the major problems associated with the ADLAT control methodology.

A description of the dynamic programming control procedure of the present invention is as follows, and a comparison is provided with the conventional ADLAT control procedure 10. FIG. 1 illustrates the conventional ADLAT control procedure 10. FIG. 1 shows oscillating pull-up and push-over parabolas 12, 13 that are designed to control an aircraft 11 to clear two obstacles 14, 15 that are representative of hills and buildings, and the like. According to the ADLAT control procedure 10, a maximum-g push-over parabola 13 is placed over each terrain point ahead of the aircraft at a desired clearance height 16 above the obstacles 14, 15, and an osculating pull-up parabola 12 is placed between the obstacles 14, 15. The resulting ADLAT trajectory 17 is a sequence of parabolic arcs that result in "bang-bang" control of the aircraft 11.

FIGS. 2a, 2b, 2c and 2d show a typical terrain following run made using the ADLAT procedure 10 described with reference to FIG. 1. FIG. 2a shows the height in meters above obstacles 14, 15 as a function of distance. FIG. 2b shows the commands issued by the aircraft control system implementing the ADLAT control procedure 10 as a function of distance. FIG. 2c shows the clearance achieved using the ADLAT control procedure 10 as a function of distance. FIG. 2d shows the velocity in meters per second of the aircraft when using the ADLAT control procedure 10 as a function of distance.

FIG. 3 shows a typical cost function employed in the terrain following run of FIG. 2. This clearance cost function is a graph of cost verses clearance in meters above an obstacle 14, 15. A typical clearance cost function is shown in FIG. 3. Here the exposure cost is represented as a parabola, and it is typically a highly irregular non-analytic function. In addition to these costs associated with altitude, the cost function may include additional items. For example, the cost of vertical acceleration or acceleration change may be included. The aircraft may be made to incur a non-zero cost each time the acceleration command is changed. By adjusting this function, one can directly control the roughness of the ride. The task of the dynamic programming procedure is to choose those accelerations which minimize the total cost function over the terrain profile. These accelerations define the control procedure that minimizes the integrated cost over the entire profile.

In contrast, a dynamic programming procedure or method 20 of the present invention performs terrain following through the minimization of cost functions. The cost function in the simple case described below represents the "cost" of being at a certain altitude above the terrain. For terrain following, the cost function is divided into two parts: cost of terrain impact and cost of intercept. The cost of terrain impact is a monotonically decreasing function of aircraft height above ground, from infinity to zero, at the command height. The cost of intercept is a monotonically increasing function of the clearance height, based on the exposure to threats as the altitude increases.

Figure 4:
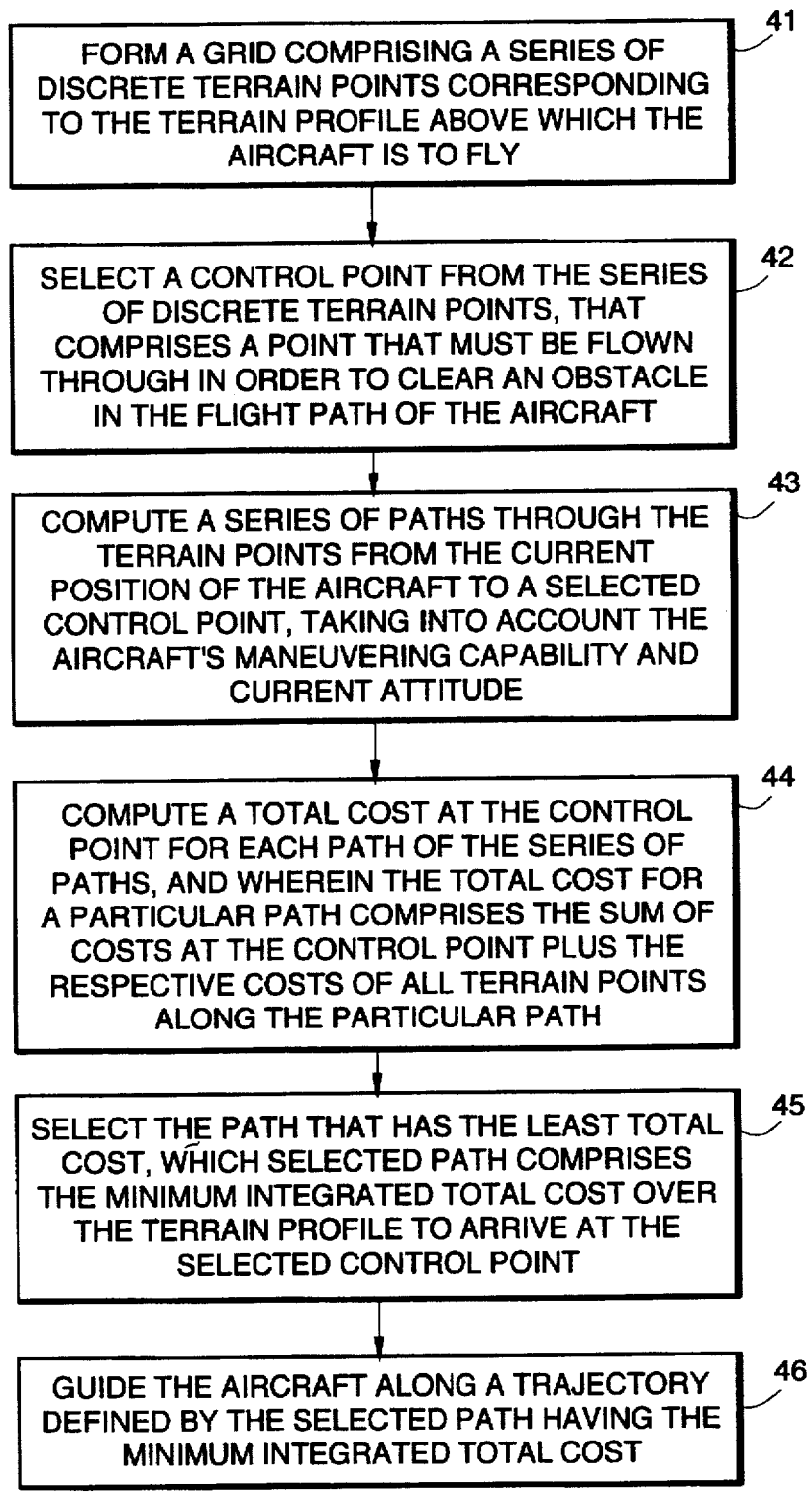
FIG. 4 shows a flow chart depicting a dynamic programming method in accordance with the principles of the present invention.
Figure 5:
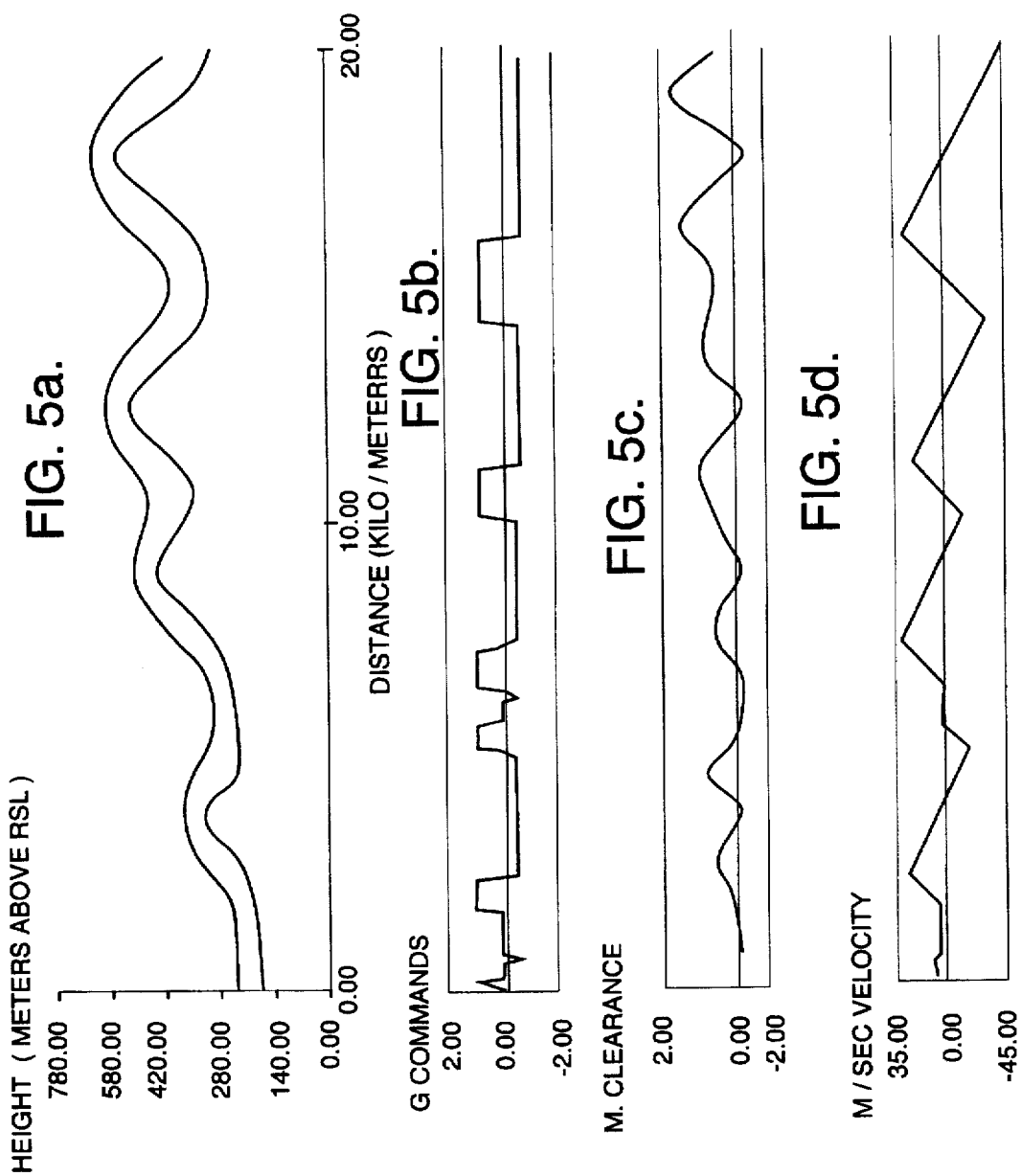
FIG. 5a, 5b, 5c and 5d show test results of the dynamic programming method in accordance with the principles of the present invention.

FIG. 4 shows a flow chart depicting a dynamic programming method 20 in accordance with the principles of the present invention. The present method 20 determines a terrain following and terrain avoidance trajectory for use in terrain following radars employed in guiding the aircraft 11 above the terrain. The method comprises the following steps. A grid comprising a series of discrete terrain points corresponding to the terrain profile above which the aircraft is to fly is formed, as is illustrated by box 41. Each terrain point has a cost associated therewith that is function of predetermined criteria including distance of each terrain point from the aircraft, a height of each terrain point above the terrain at each distance, and attitude of the aircraft at its current position and at each terrain point, as is illustrated by box 42. A cost is assigned to each of the discrete terrain points that is representative of the cost to get to the point based upon the predetermined criteria, as is illustrated by box 43. A control or terminal point is selected from the series of discrete terrain points, which terminal point comprises a terrain point that must be flown through at the end of the trajectory over the terrain, or in order to clear an obstacle in the flight path of the aircraft.

A series of paths is computed through the terrain points from a starting point at the current position of the aircraft to a selected terminal point, taking into account the aircraft's maneuvering capability and current attitude, as is illustrated by box 44. A total cost at the terminal point is computed for each path of the series of paths, and wherein the total cost for a particular path comprises the sum of costs at the terminal point plus the respective costs of all terrain points along the particular path, as is illustrated by box 44. The path that has the least total cost is selected and which comprises the minimum integrated total cost over the terrain profile to arrive at the selected terminal point, as is illustrated by box 45. The aircraft is then guided along a trajectory defined by the selected path having the minimum integrated total cost, as is illustrated by box 46.

A sample case will now be described. To compare the dynamic programming procedure 10 of the present invention with the conventional ADLAT procedure 10, a simulation was performed over the same profile as used for the test run shown in FIGS. 2a–2d. A terrain following command height of 60 meters was chosen, along with an aircraft horizontal velocity of 250 meters/second. Climb and dive limits of 10 degrees were used. The acceleration limits were +1 g and −½ g (incremental). These are the same parameters used to generate the profile of FIG. 1. The cost function was modified to include a cost for excessive acceleration changes.

In the ADLAT run shown in FIGS. 2a–2d, a hard lower limit of 60 meters was placed on the terrain following clearance. For the dynamic programming procedure 20 of the present invention, a 10 percent (6 meter) under- and overshoot of the terrain following command height was allowed. This tolerance about the command height reflects a somewhat more realistic approach to the terrain following procedure 20 of the present invention. It is simple to include this in the dynamic programming procedure 20, but would introduce additional complexity into the ADLAT procedure 10. This simple addition is one way of reducing the rough ride effect of ADLAT procedure 10. It should be noted that if a hard lower limit is required, its inclusion in the cost function is trivial: all that is necessary is to provide an infinite cost for flying below the command height. A "zero cost" tolerance region can then be placed above the command height. This region need not be very large; 10 meters or so is probably adequate. The cost function is suitably and easily modified to provide any desired tolerance region, eliminating any undershoot. For the purposes of the simulation, however, it was decided to allow an undershoot in the initial run to gauge its effect. As will be seen from the results, the undershoot effect is minor.

The results of the dynamic programming run implemented in accordance with the procedure 20 of the present invention are shown in FIGS. 5a–5d. The four graphs show the same types of data as the graphs of FIGS. 2a–2d. A comparison of the results of the dynamic programming procedure 20 of the present invention and the ADLAT procedure 10 of FIGS. 2a–2d shows that the rough-ride effect of the ADLAT procedure 10 has been greatly reduced. For example, the ADLAT procedure 10 required 56 acceleration changes over the 20 kilometer path, while the present dynamic programming procedure 20 required only 18 acceleration changes. This mounts to a 68% reduction in the number of acceleration changes. It is important to note that even further reductions in the number of acceleration changes are possible by increasing the cost for acceleration changes in the dynamic programming objective cost function.

Figure 6:
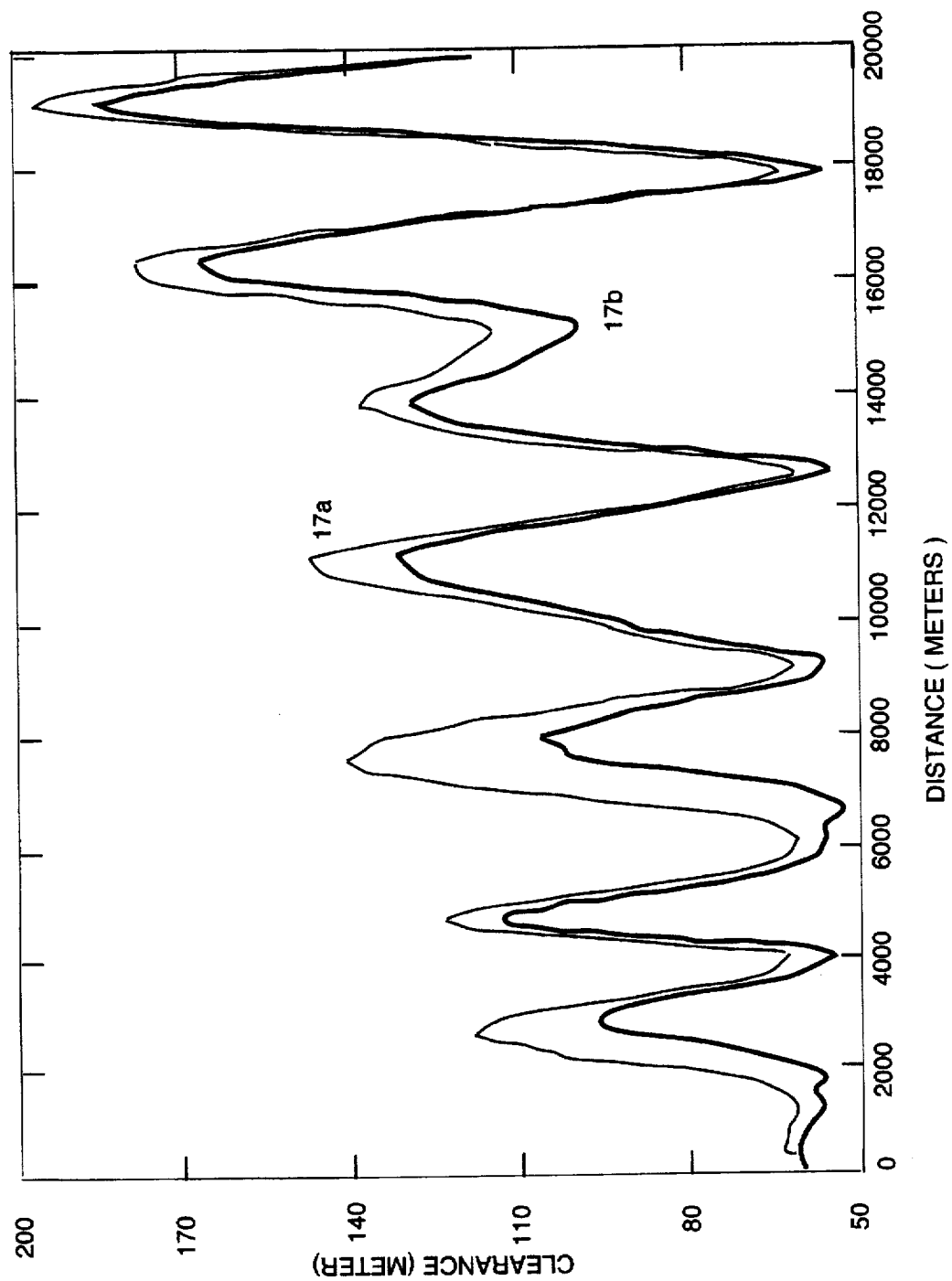
FIG. 6 shows a comparison of clearance performance for the two runs shown in FIGS. 2 and 5.

Comparison of clearance performance for the two runs is shown in FIG. 6. The dynamic programming path or trajectory 17b is always below the ADLAT path 17a. In fact, on the average the aircraft 11 using the dynamic programming procedure 20 flew 13 meters lower for the flight. The maximum difference between the two flight paths 17a, 17b was 51 meters (see FIG. 6), occurring at about 8 kilometers from the beginning.

The ten percent height tolerance in the dynamic programming procedure 20 resulted in occasional undershooting of the terrain following command height; at its lowest point, the aircraft 11 was 52 meters above the ground. As stated above, this undershoot may be completely eliminated by altering the cost function. However, even if the entire path were displaced uniformly upward by 8 meters, it would still be an average of 5 meters under the ADLAT path 17a.

The dynamic programming procedure 20 of the present invention overcomes or eliminates all of the major problems of the ADLAT procedure 10. The rough-ride effect is eliminated by a suitable weighting of acceleration and acceleration changes. The dynamic programming procedure 20 is ideally suited for optimal route planning; all that is required is to modify the cost function to reflect the exposure risk. The present procedure 20 is readily expandable to three dimensions. Decisions to fly over or around obstacles are automatic. The present procedure 20 easily adapts to changes in horizontal speed by introducing another cost function. The optimal procedure 20 of the present invention thus includes a horizontal acceleration as well as a vertical acceleration to achieve the minimum cost flight trajectory.

The addition of more constraints is trivial in the present procedure 20, and in fact, the more constraints that are placed on the process, the simpler it becomes. This fact is derivable from a reading of a book entitled "Adaptive Control Processes," by R. E. Bellman, Princeton University Press, 1961. For example, the incorporation of climb and dive limits in the present procedure 20 resulted in a considerable simplification. Finally, the dynamic programming procedure 20 provides a complete command procedure over the entire profile (or surface). It need only be updated when additional terrain or threat information becomes available. Since the present procedure 20 is independent of the explicit form of the cost function, it has great versatility. Features may be added or deleted at will by simple modifications of the cost function.

The use of the present dynamic programming procedure 20 for terrain following and threat avoidance offers great promise for future aircraft applications. In its initial tests described herein, it was shown to perform in a manner substantially superior to the conventional ADLAT procedure 10. In addition, it may incorporate many features that would be difficult if not impossible for the ADLAT procedure 10.

Thus there has been described a new and improved method for determining terrain following and terrain avoidance trajectories for use in terrain following radars. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A method for determining a terrain following and terrain avoidance trajectory for use in terrain following radars employed in guiding a moving aircraft above a predetermined terrain profile, said method comprising the steps of:

forming a grid comprising a series of discrete terrain points corresponding to terrain above which the aircraft is to fly, each terrain point having a cost associated therewith that is function of predetermined criteria, and wherein a cost is assigned to each of the discrete terrain points that is representative of the cost to get to the point based upon the predetermined criteria;

selecting a terminal point from the series of discrete terrain points, which terminal point comprises a terrain point through which the aircraft must fly at the end of the trajectory over the terrain;

computing a series of paths through the terrain points from a starting point at a current position of the aircraft to the selected terminal point, taking into account the aircraft's maneuvering capability and current attitude, and computing a total cost at the terminal point for each path of the series of paths, and wherein the total cost for a particular path comprises the sum of costs at the terminal point plus the respective costs of all terrain points along the particular path;

selecting the path that has the least total cost, which selected path comprises the minimum integrated total cost over the terrain profile to arrive at the selected terminal point; and guiding the aircraft along a trajectory defined by the selected path having the minimum integrated total cost.

2. The method of claim 1 wherein the predetermined criteria include distance of each terrain point from the aircraft, height of each terrain point above the terrain at each distance, and attitude of the aircraft at its current position and at each terrain point.

3. A method for determining a terrain following and terrain avoidance trajectory for use in terrain following radars employed in guiding a moving aircraft above a predetermined terrain profile, said method comprising the steps of:

forming a grid comprising a series of discrete terrain points corresponding to terrain above which the aircraft is to fly, each terrain point having a cost associated therewith that is function of predetermined criteria including distance of each terrain point from the aircraft, a height of each terrain point above the terrain at each distance, and attitude of the aircraft at its current position and at each terrain point, and wherein a cost is assigned to each of the discrete terrain points that is representative of the cost to get to the point based upon the predetermined criteria;

selecting a terminal point from the series of discrete terrain points, which terminal point comprises a terrain point through which the aircraft must fly at the end of the trajectory over the terrain;

computing a series of paths through the terrain points from a starting point at a current position of the aircraft to the selected terminal point, taking into account the aircraft's maneuvering capability and current attitude, and computing a total cost at the terminal point for each path of the series of paths, and wherein the total cost for a particular path comprises the sum of costs at the terminal point plus the respective costs of all terrain points along the particular path;

selecting the path that has the least total cost, which selected path comprises the minimum integrated total cost over the terrain profile to arrive at the selected terminal point; and guiding the aircraft along a trajectory defined by the selected path having the minimum integrated total cost.

* * * * *